April 13, 1954  V. E. MATULAITIS  2,675,178
AUTOMATIC AIR TEMPERATURE CONTROL SYSTEM
Original Filed July 28, 1949
2 Sheets-Sheet 2
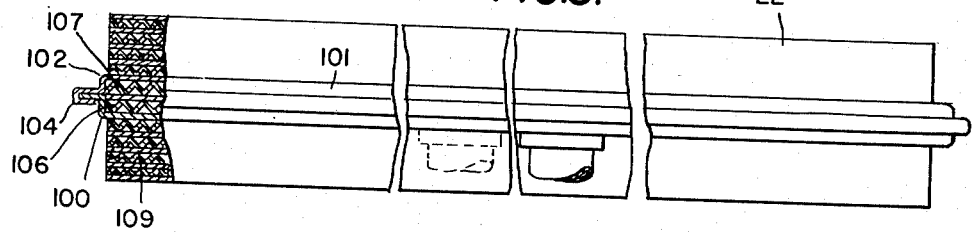
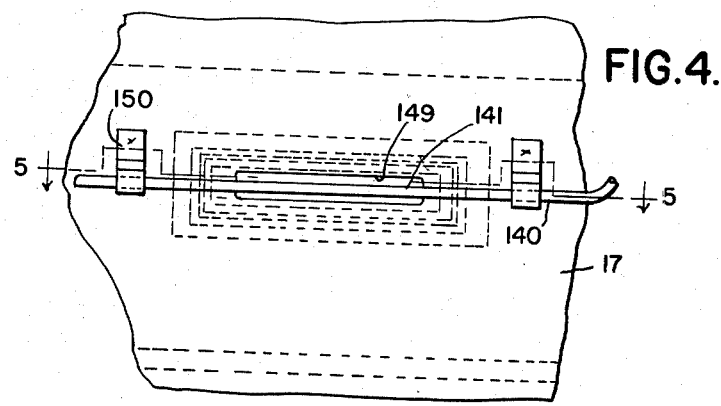
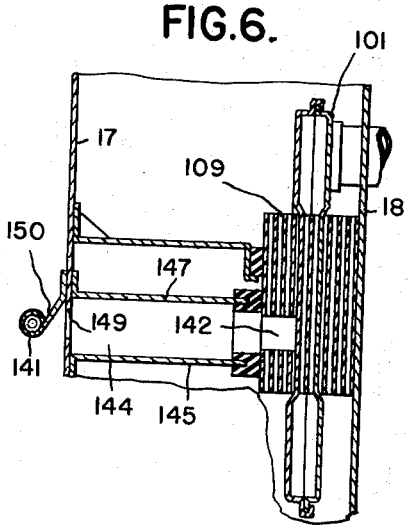 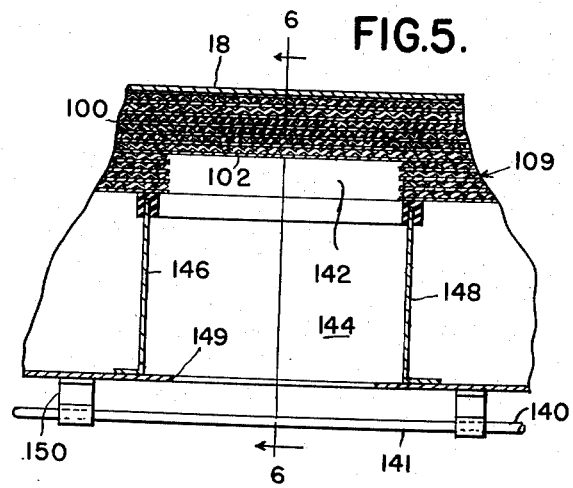
INVENTOR.
VICTOR E. MATULAITIS
BY
ATTORNEYS

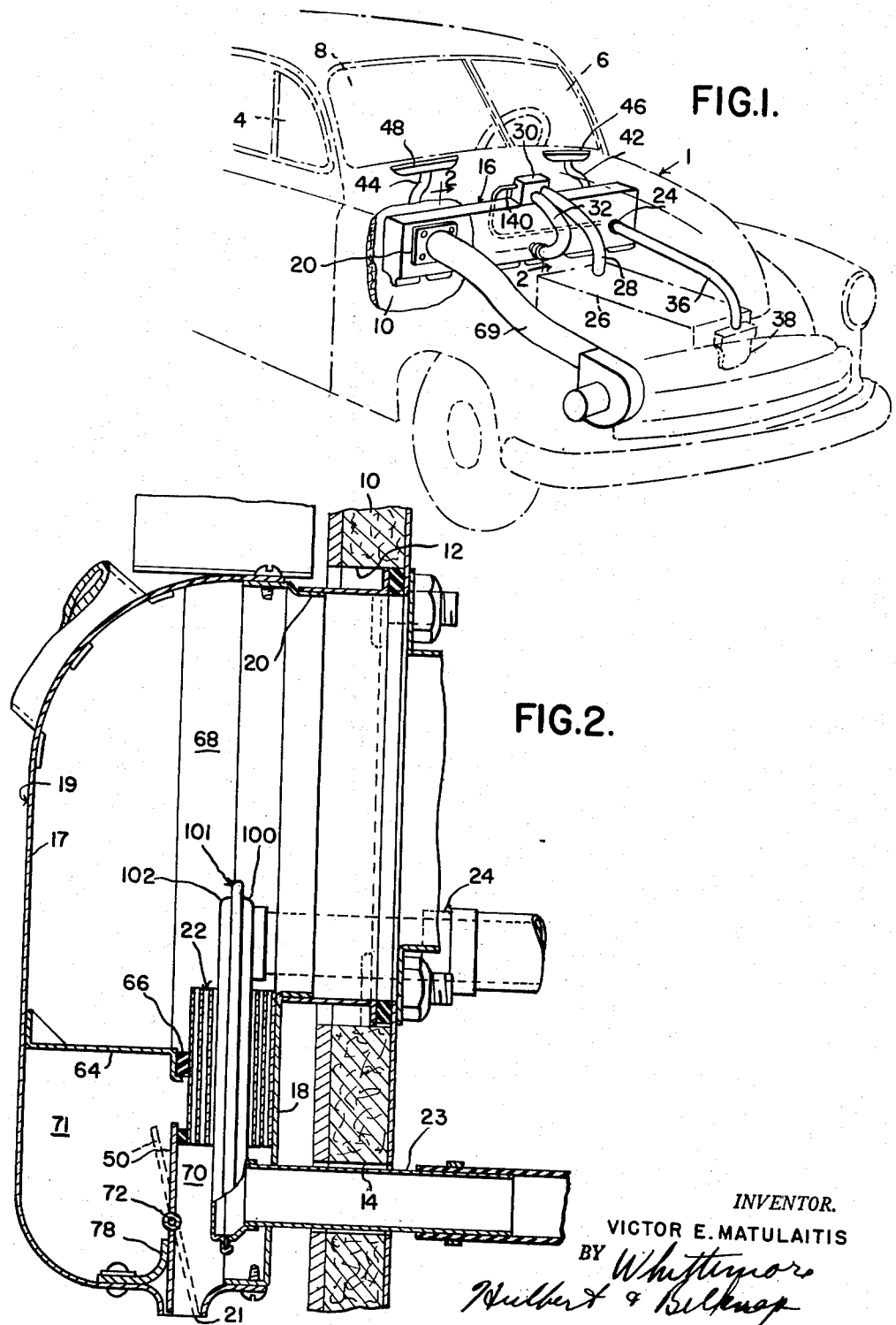

Patented Apr. 13, 1954

2,675,178

UNITED STATES PATENT OFFICE 2,675,178

AUTOMATIC AIR TEMPERATURE CONTROL SYSTEM

Victor E. Matulaitis, Franklin, Mich.

Original application July 28, 1949, Serial No. 107,332. Divided and this application March 10, 1952, Serial No. 275,789

10 Claims. (Cl. 236—36)

This application is a division of my application Serial No. 107,332, filed July 28, 1949.

The present invention relates to automatic air temperature control system and finds its greatest utility in conjunction with a heating system for an automotive vehicle.

It is an object of the present invention to provide a space heater including temperature control means responsive to temperature of the space and temperature control means responsive to the temperature of air at an intermediate stage of heating, in which the temperature control means is responsive to the lower of the two temperatures aforesaid so as to maintain a minimum temperature of air discharged into the space during such time as the space is at or above the desired temperature.

More specifically, it is an object of the present invention to provide a space heater in conjunction with temperature control means of the type comprising a temperature responsive element effective to control heating means in accordance with the lowest temperature to which any portion of the element is subjected, one portion of said element being subjected to ambient temperature within a space to be heated and another portion of said element being subjected to air at an intermediate stage of heating.

It is a further object of the present invention to provide a space heater including a heat transfer core, heating means for heating said core, means for forcing air to be heated through said core, by-pass means for by-passing a portion of said air intermediate the inlet and outlet of said core, and temperature control means responsive in part to the temperature of such by-pass air.

Other objects and features of the invention will become apparent as the description proceeds, especially when taken in conjunction with the accompanying drawings, wherein:

Figure 1 is a perspective diagrammatic partial view of a motor vehicle equipped with a heater embodying the present invention.

Figure 2 is an enlarged view of the heater taken substantially along the line 2—2, Figure 1.

Figure 3 is a plan view of the heat transfer core employed in the heater, with parts in section.

Figure 4 is a fragmentary left side view of the heater shown in Figure 2 showing a portion of the temperature control arrangement for controlling the flow of heating fluid to the heater.

Figure 5 is a view taken substantially along the line 5—5, Figure 4.

Figure 6 is a view taken substantially along the line 6—6, Figure 5.

Referring now to the drawings, there is illustrated at 1 a portion of a motor vehicle having an engine compartment 2, a passenger space 4, windshield portions 6 and 8, and a fire wall 10. The fire wall 10 is provided with a suitable number of apertures, some of which are shown at 12 and 14 (Figure 2) for mounting a motor vehicle heater generally designated 16, and which as shown extends transversely of the vehicle and substantially completely across the width thereof. The heater 16 comprises a dished sheet metal member 17 having a peripheral wall closed by a substantially planar sheet metal piece 18 to form a box-like member or housing 19 having adjacent one end thereof an air inlet 20 and a series of downwardly opening elongated air discharge passageways 21 across the length of the heater. The inlet 20 may be positioned anywhere along the length of the heater 16. A core 22 is carried within the housing 19 and is provided with an inlet 23 and an outlet 24 for flow of heat supplying medium. Such medium in a motor vehicle may be the coolant used for the motor vehicle engine.

The coolant preferably is supplied from the engine 26 through a conduit 28, a flow controlling thermostatic device 30, and a conduit 32 to the heater inlet 23. The coolant after flowing through the core 22 passes outwardly through the outlet 24 and a conduit 36 back to the motor vehicle cooling system, as for example, the coolant pump 38.

Air for defrosting the windshields 6 and 8 is distributed thereto through conduits 42 and 44 and nozzles 46 and 48 respectively. The flow of air to the vehicle and for defrosting is controlled by a damper 50. The core structure 22 is located adjacent the front wall 18 of the sheet metal housing 19 and spaced slightly upwardly from the lower edge thereof. A transversely extending wall 64 is provided substantially midway of the core 22 and extends between the rear wall portion of the sheet metal member 17 and the core 22, the joint between the transverse wall 64 and the core 22 being sealed by suitable resilient sealing member 66. The wall 64 and the core 22 cooperate with the housing 19 to provide an inlet plenum chamber 68 which is supplied with air from a conduit or duct 69 connected to the inlet 20. The air admitted through the inlet 20 distributes itself substantially equally from end-to-end of the heater 16 for flow downwardly through the core 22 into a lower plenum or distributing chamber 70. The chamber 70 is in selective communication with the elongated fluid distributing slots 21 and with a chamber 71 separated from the chamber 70 by the damper 50.

As best seen in Figure 2, the damper 50 is of the butterfly type and is pivotally supported on a shaft 72 journaled in the housing 19. In the position of the damper 50 shown in full lines, its upper end engages a resilient sealing member 74 similar to the member 66 for completely shutting off flow of air between the chamber 70 and the defrosting air distributing chamber 71, whereby all the air passing through the core 22 is discharged from the plenum chamber 70 through the outlets 21 for heating the interior of the motor vehicle. Additional sealing means such as a flexible strip 78 is provided to abut against the lower half of the butterfly damper or valve 50 and to follow the rotative movement of the damper so that flow of air from the chamber 71 outwardly through the outlets 21 is prevented. The damper 50 may be rotatively positioned as desired by means of a crank arm or other suitable means (not shown) for rotating the shaft 72. Positioning of the damper 50, in the dash line position thereof as shown in Figure 2, restricts the flow of air outwardly through the outlets 21 and opens a fluid flow path between the chambers 70 and 71 for causing air to flow from the chamber 70 into the chamber 71 for flow upwardly through vertically extending passageways located at opposite ends of the heater 16. The passageways referred to communicate with the chamber 71 and with the conduits 42 and 44 previously described.

Referring now more particularly to Figures 2 and 3, the core 22 comprises a receptacle 101 formed by a pair of dished sheet metal members 100 and 102 which are arranged in face-to-face relation and have their peripheral edges secured together as by the flange 104 of the member 102, to provide an inner chamber 106 for containing the heat supplying medium. The lower portion of the receptacle 101 constitutes an inlet distributing chamber and the upper portion thereof constitutes an outlet distributing chamber. Intermediate the distributing chambers the receptacle is preferably provided with metallic heat transfer elements 107 which in addition channelize the flow of heating fluid therethrough. In this manner water admitted through the inlet 23 will disperse itself throughout the lower chamber for substantially equal flow upwardly through the channels and adjacent the outer surface of the receptacle into the upper outlet chamber where it is collected and discharged outwardly through the outlet 24.

In good heat transfer relationship to the outer walls of the receptacle 101 is provided metal ribbons or strip structure indicated generally at 109, which defines a multiplicity of vertically arranged passages for air. The metallic structure 109 is interconnected in good heat conducting relation and is heated by conduction from the receptacle 101 so that as air passes downwardly through the passageways provided therein, the air is heated.

In Figure 1 of the drawings there is shown a thermostatic flow controlling device 30 for regulating the flow of heating fluid through the receptacle 101. This device 30 is controlled by means of an expansible, contractible fluid located within a small bore tube 140 which extends outwardly from the control device 30 to provide a tube portion 141 at the back of the heater, as illustrated in Figure 6. The tube 140 also has a portion responsive to the temperature within the motor vehicle. The quantity of control fluid in the conduit 140 is proportioned such that within the operating temperature range of the device 30 only a small quantity of fluid in liquid form will be present in the conduit 140. Therefore, the coldest section of the conduit 140 will act as a control temperature for the thermostatic device 30. Thermostatic devices of this type are available on the open market and one such is described in Raney 2,298,164 granted October 6, 1942.

The thermostatic device 30 is provided with a valve mechanism (not shown) for regulating the flow of heating medium to the receptacle 101 of the core 22 in accordance with the coldest temperature to which any portion of the capillary control tube 140 is subjected. In the present case the controlling tube is associated with the heater in a novel manner to provide for an improved temperature regulation.

More specifically, the arrangement provides for preventing the thermostatic device from reducing the flow of engine coolant to the heater below a minimum temperature which is selected so as to substantially counterbalance heat losses. In other words, when the interior of the vehicle is at the proper temperature, the temperature of the incoming air is reduced but only to an amount sufficient to maintain the temperature at approximately the required point.

To accomplish this result means are provided for by-passing a portion of air which has passed part way through the heat transfer core so as to be partially heated, and directing this by-passed air over the portion 141 of the tube 140. Thus, when the temperature of this partially heated air is below the desired vehicle temperature then the control of the device 30 will be in accordance with the temperature of the partially heated air rather than as occurs under other conditions of operation under control of a second section of the tube 140 which is responsive to temperature within the vehicle.

In this case it is to be observed that the temperature responsive device is manufactured or adjusted to operate at a particular temperature and regulation cannot be obtained which requires portions of the tube to be maintained at different temperatures and to effect regulation thereby. In other words, if the tube is designed or adjusted to be responsive to operate the valve or control device 30 at a temperature of 70 degrees, the valve will be opened when any portion of the tube is subjected to a temperature of less than 70 degrees. Thereafter, if the temperature within the vehicle is 70 degrees, the thermostatic control device as a whole will operate to maintain the temperature of the by-passed air at 70 degrees. It follows since the by-passed air is withdrawn from the heat transfer core at a point intermediate the entrance and exit point of air relative thereto, that the by-passed air will be at a temperature intermediate the temperature of the air as it enters the heat exchange core and the temperature of the air as it is discharged from the heat exchange core. It follows from this that assuming the tube 140 is manufactured or adjusted to effect control of the valve to maintain a temperature of 70 degrees, when the interior of the vehicle is above 70 degrees the tube will operate to maintain the temperature of the by-passed air at 70 degrees, and accordingly the temperature of the air discharged into the interior of the vehicle will be substantially above 70 degrees. In an ideal situation the temperature of the air discharged into the vehicle will be sufficiently above 70 degrees to make up for normal heat losses so as to maintain the temperature of the air within the vehicle at the desired point.

Specifically, to provide for a flow of this partially heated air over a portion of the tube 140, the strip structure 109 is cut away to provide a pocket 142 which opens outwardly into a passageway 144 formed between sheet members 145, 146, 147 and 148 extending between the surface of the member 102 and the rear wall of the dished member 17. An aperture 149 in the member 17 permits a limited amount of air to flow outwardly of the chamber 144 and across the portion 141 of the tube 140. Conveniently, a portion of the tube is carried by ears 150. The air flowing out of the passageway or chamber 144 is discharged into the interior of the vehicle.

It will be observed that the air passing through the passageway 144 does not pass through the plenum chamber 70 and is therefore not subjected to the restriction to flow provided by the restricted discharge passageway 21. As a result of this the air passing through the temperature control portion of the core has a higher velocity than air passing through the rest of the heater and accordingly the temperature control portion of the air is heated to a lower temperature than the air which is discharged into the passenger compartment.

In addition, since the pocket 142 is preferably located intermediate the entrance and exit ends of the heater, the temperature control air passing therethrough is subjected to only a fraction of the resistance to flow of air through the core of the heater. Thus, two factors operate to maintain the temperature control air discharged through the passageway 144 at a temperature lower than the air discharged into the passenger compartment. These factors are of the absence of the restriction to flow provided by the plenum chamber and its restricted outlet, and the fact that the temperature control air preferably passes through less than full depth of the core and is accordingly subjected to less resistance.

During operation of the heater 16 when the vehicle temperature is below the desired temperature, the device 30 will permit engine coolant to flow through the core 22 in sufficient quantity to raise the temperature of the air admitted through the inlet 20 to a temperature above that within the vehicle. During this operation the air passing outwardly of the core 22 into the passageway 144 and outwardly through the aperture 149 will be heated to a temperature somewhat below the temperature of the air being discharged through the outlets 21 and will be at a temperature above the temperature of the vehicle and will not be able to control the device 30 since a second portion of the tube 140 responsive to vehicle temperature will be at a lower temperature and will control.

As the temperature of the vehicle approaches the desired temperature, the device 30 will act to reduce the flow of engine coolant to the core 22 and as a result the temperature of the air discharging outwardly of the passageways 21 will drop and there will be a corresponding drop in temperature of the air discharging through the aperture 149. Before the temperature of the air passing outwardly of the aperture or slot 21 is reduced sufficiently to be objectionable to the occupants of the vehicle, the temperature of the air passing out of the aperture 149 will have decreased to cause the tube portion 141 to be the control point of the tube. In other words, the portion 141 of the tube will operate to cause air passing outwardly through the opening 149 to be maintained at the desired temperature of air within the vehicle and accordingly, the air ultimately discharged through the slots 21 will be at a somewhat higher temperature and thus necessarily above the desired temperature within the vehicle. As a consequence of the change in control to the portion 141 the device 30 will then be actuated to increase the flow of engine coolant to the core 22 to maintain the temperature of the portion 141 at the desired vehicle temperature, and the air discharged through the openings 21 into the vehicle will thus be maintained at a temperature somewhat above the desired temperature within the vehicle.

With the use of counterflow heating of the air as shown, throttling of the flow of engine coolant through the core will cause an increase in the differential in temperature between that of the air flowing across the portion 141 and that flowing outwardly of the apertures 21 which still further aids in shifting of the control point for the device 30 to prevent a flow of objectionably cold air outwardly of the apertures 21. In passing, it is well to point out that in the absence of such control arrangement the device 30 might reduce the flow of engine coolant to the core 22 such that the air flowing from the heater into the vehicle actually was substantially cooler than that desired. Until the temperature of the vehicle was lowered by such air to a temperature below that desired, the control device would not act to increase the flow of heating fluid to the core 22. This would result in a chilling effect on the occupants of the vehicle which is undesirable. With the arrangement described herein such flow of cold air is prevented and at no time can such a flow chill the occupants. Neither will the heater act to overheat the vehicle since the relative temperatures of the air leaving the apertures 21 and 149 will act to control the temperature of the air discharged through the apertures 21 somewhat above the desired temperature which will neither cause an uncomfortable increase in the vehicle temperature nor permit a chilling flow of air which would be objectionable.

The location of the pocket 142 which forms the entrance to the by-pass passages for air will determine the temperature at which air is discharged into the interior of the vehicle, when the interior of the vehicle is at or above the desired temperature. As previously stated, optimum results would be obtained when the temperature of air discharged into the interior of the vehicle when the interior of the vehicle was at the desired temperature, was such as to make up heat losses from the interior of the vehicle.

Certain modifications of the basic arrangement illustrated and described herein will be apparent to those skilled in the art. Thus, for example, a plurality of pockets 142 could be provided located at different distances from the entrance end of the core, and these could be selectively connected or shut off to by-pass air to different portions of the tube 140. Thus, if the outside temperature was extremely cold it would be desirable to by-pass air from a pocket more closely adjacent the air entrance end of the core so that air discharged from the core would be at a higher temperature.

Alternatively, a modification could be dependent upon mixing a predetermined proportion of outside air with the by-passed air in the chamber 144 so that outside temperature would have a controlling effect in which the temperature of the air discharged into the interior of the vehicle when the temperature of the vehicle was at or above the desired point, would be in part controlled by the temperature of the outside air. Thus, if the outside air were extremely cold, relatively warmer air would be introduced into the interior of the vehicle to make up for normal heat losses and thus to maintain interior temperature of the vehicle substantially constant.

One of the important advantages of the present invention is that by virtue thereof substantial overshooting or under-shooting of temperature is effectively prevented. A second advantage is that a substantial flow of air is provided at all times and while the interior of the vehicle is at or above the desired temperature, this flow of air is warmer than the interior temperature of the vehicle so as to avoid cold drafts which would be objectionable to the occupants.

The drawings and the foregoing specification constitute a description of the improved automatic air temperature control system in such full, clear, concise and exact terms as to enable any person skilled in the art to practice the invention, the scope of which is indicated by the appended claims.

What I claim as my invention is:

1. In a heater, a housing having a passageway for flow of fluid therethrough having an inlet and an outlet, a heat exchange member located in said passageway intermediate said inlet and said outlet, means regulating the heat output of said member including temperature responsive means having two control portions, said housing having a by-pass outlet, one of said control portions being subjected to air flowing through said by-pass outlet, and means for supplying fluid from an intermediate portion of said member for flow outwardly of said by-pass outlet.

2. A heater for motor vehicles and the like comprising a housing having an inlet and an outlet for air to be heated, a heat exchange core positioned within said housing intermediate inlet and said outlet, a regulating valve provided for regulating the quantity of heat supplied to said core and including a temperature responsive element, said element having two interconnecting controlling portions whereby the one of said portions at the lowest temperature actuates said valve, a first of said portions being adapted to be responsive to the temperature of the vehicle space to be tempered, said core being provided with means to by-pass a portion of the air passing therethrough before said air portion is fully tempered by said core, and a second of said element portions being responsive to the temperature of said air portion.

3. Space tempering means comprising a heat exchanger including a core through which tempering air flows, control means for said heat exchanger comprising temperature responsive means located in the space to be tempered, and temperature responsive means located in proximity to said core, means for conducting partially tempered air from an intermediate zone of said core to said second temperature responsive means, said control means being operable only by the temperature responsive means subjected to the lower temperature, whereby upon attainment of a predetermined temperature in the space, the temperature responsive means responsive to partially tempered air assumes control and will control the heat exchanger to supply air to the space tempered slightly beyond the temperature desired in the space.

4. An air heater comprising a heat exchange core through which air flows to a space to be heated, a by-pass for withdrawing partially heated air from said core, control means for controlling the supply of heat to said core, a temperature responsive element operatively connected to said control means comprising a capillary control tube operable to actuate said control means in accordance with the lowest temperature to which any part of said tube is subjected, said tube being located in the space to be heated and having a portion thereof in position to be contacted by partially heated air from said by-pass.

5. A space heater comprising a heat exchange core, means for supplying a heating medium to said core, said core including restricted passage means through which air flows to be heated by said core, said passage means having an inlet and outlet, a by-pass passage communicating with said passage means intermediate the inlet and outlet thereof to withdraw partially heated air from said passage means, temperature responsive means located in position to be affected by the temperature of air flowing through said by-pass passage, and temperature regulating means under the control of said temperature responsive means for controlling the supply of heating medium to said core.

6. A space heater as defined in claim 5, comprising a blower for forcing air through said core under pressure, and to force a flow of air through said by-pass passage.

7. Vehicle heating apparatus comprising a casing having inlet and outlet plenum chambers therein, a heat exchange core in said casing separating said chambers, means for circulating heating medium through said core, means defining a passage for the flow of partially heated air from an intermediate part of said core to the exterior of said casing, control means for regulating the flow of heating medium comprising temperature responsive means of the type comprising an elongated tube responsive to the lowest temperature to which any portion of the tube is subjected, said tube being located within the passenger compartment of the vehicle and having a portion thereof located in the path of partially heated air flowing from said casing through said passage.

8. A space heater comprising a casing having an upper air inlet plenum chamber, a lower air outlet plenum chamber and a heat exchange core intermediate said chambers, said core having a vertically disposed passage for the flow of heating medium therethrough, means for circulating heating medium vertically upwardly through said passage, a by-pass extending into the path of air flowing downwardly through said core intermediate the top and bottom thereof and having an outlet in the space to be heated, control means for regulating the flow of heating medium through said passage of the type comprising an elongated tube responsive to the lowest temperature to which any portion of the tube is subjected, said tube being located in the space to be heated and subject to ambient temperature therein, a portion of said tube being located at the outlet of said by-pass to be subjected to partially heated air withdrawn from said core.

9. A heater for motor vehicles and the like comprising a housing having an inlet and a discharge plenum chamber provided with a restricted outlet for air to be heated, a heat exchange core positioned within said housing intermediate said inlet and said discharge plenum chamber, a regulating valve providing for regulating the quantity of heat supplied to said core and including a temperature responsive element, said element having two interconnecting controlling portions whereby the one of said controlling portions at the lower temperature controls said valve, one of said portions being adapted to be responsive to the temperature of the vehicle space to be tempered, said core being provided with means to bypass a portion of the air passing therethrough around said plenum chamber to thereby provide for flow of air therethrough at a higher velocity than the flow of air through the remainder of the core and to thereby heat such bypassed air to a temperature lower than the temperature to which the air passing through the plenum chamber is heated, and the second of said element portions being responsive to the temperature of such bypassed air.

10. A heater as defined in claim 9 in which said means for bypassing a portion of the air is located intermediate the entrance and exit ends of the core whereby such bypassed air passes through less than full depth of the core and is accordingly subjected to less than full core restriction to flow.

References Cited in the file of this patent

UNITED STATES PATENTS

| Number | Name | Date |
|---|---|---|
| 2,262,496 | Hobbs | Nov. 11, 1941 |
| 2,298,163 | Raney | Oct. 6, 1942 |
| 2,490,919 | Raney | Dec. 13, 1949 |